(12) United States Patent
Mori et al.

(10) Patent No.: US 8,305,561 B2
(45) Date of Patent: Nov. 6, 2012

(54) SCANNING-TYPE DISTANCE MEASURING APPARATUS

(75) Inventors: Toshihiro Mori, Amagasaki (JP); Shinichi Tsukuda, Amagasaki (JP)

(73) Assignee: Hokuyo Automatic Co., Ltd., Osaka (JP)

( * ) Notice: Subject to any disclaimer, the term of this patent is extended or adjusted under 35 U.S.C. 154(b) by 122 days.

(21) Appl. No.: 12/731,680

(22) Filed: Mar. 25, 2010

(65) Prior Publication Data

US 2011/0235018 A1 Sep. 29, 2011

(51) Int. Cl.
*G01C 3/08* (2006.01)
(52) U.S. Cl. ....... 356/5.01; 356/4.01; 356/4.1; 356/28.5
(58) Field of Classification Search ......... 356/3.01–28.5
See application file for complete search history.

(56) References Cited

U.S. PATENT DOCUMENTS

| 5,455,669 | A | 10/1995 | Wetteborn | |
| 7,403,269 | B2 * | 7/2008 | Yamashita et al. | 356/5.01 |
| 2008/0158555 | A1 * | 7/2008 | Mori | 356/239.2 |

FOREIGN PATENT DOCUMENTS

| JP | 03-126260 | 12/1991 |
| JP | 07-154909 | 6/1995 |
| JP | 09-152483 | 6/1997 |
| JP | 2001-311612 | 11/2001 |
| JP | 2006349449 A | 12/2006 |
| JP | 2007-170917 | 7/2007 |

OTHER PUBLICATIONS

Japanese Office Action dated Nov. 1, 2011.
Japanese Office Action dated Jul. 31, 2012.

* cited by examiner

*Primary Examiner* — Luke Ratcliffe
(74) *Attorney, Agent, or Firm* — Pillsbury Winthrop Shaw Pittman, LLP

(57) ABSTRACT

A scanning-type distance measuring apparatus includes: an optical system 9 having a first deflecting member 9a that deflects measurement light output from a light transmitting unit 3 toward a space to be measured via an optical window, a light receiving lens 9c that condenses reflection light from an object R to be measured existing in the space to be measured, and a second deflecting member 9b that deflects the reflection light passed through the light receiving lens toward a light receiving unit 5 disposed to oppose the light transmitting unit 3; a scanning mechanism 4 that rotates the optical system 9 about a predetermined axis P; and an optical member 90 that outputs the measurement light deflected by the first deflecting member 9a from an incident light path Lc of the reflection light to the second deflecting member 9b.

7 Claims, 14 Drawing Sheets

SCANNING-TYPE DISTANCE MEASURING APPARATUS

This application is based on an application No. 2007-229828 filed in Japan, the contents of which are hereby incorporated by reference.

BACKGROUND OF THE INVENTION

1. Field of the Invention

The present invention relates to a scanning-type distance measuring apparatus for scanning a space to be measured with measurement light and measuring a distance to an object to be measured on the basis of the measurement light and reflection light from the object to be measured existing in the space to be measured.

2. Description of the Related Art

A scanning-type distance measuring apparatus of this kind is used in a navigation sensor as a visual recognition sensor for a robot or an unmanned vehicle, a door open/close sensor, a safety sensor for detecting a person or matter approaching a dangerous machine and safely stopping the machine, an ETC system sensor for detecting the shape of a car, determining the type of the car, and counting the number of cars passing, a traffic sensor for detecting people, counting the number of people, and detecting traffic and the flow of people, a monitor sensor for detecting the presence or absence of an intruder to a monitored area, and the like.

The scanning-type distance measuring apparatus has a light transmitting unit that outputs measurement light, a scanning unit that scans a space to be measured with the measurement light emitted from the light transmitting unit; a light receiving unit that detects reflection light from an object to be measured existing in the space to be measured; and a computing unit that calculates a distance to the object to be measured on the basis of the measurement light and the reflection light detected by the light receiving unit.

Such a scanning-type distance measuring apparatus is disclosed in U.S. Pat. No. 5,455,669 and Japanese Unexamined Patent Publication No. 2006-349449.

As shown in FIG. 13, a laser range finding apparatus 500 described in U.S. Pat. No. 5,455,669 has a light transmitting unit including a laser light source 504 and a lens 505, a light receiving unit including a light receiving lens 508 and a light receiving device 509 such as a photodiode, a transmission/reception mirror 503 attached to the rotation axis 501 of a motor 502, and a reflection mirror 506 that deflects measurement light from the light transmitting unit toward the transmission/reception mirror 503. Reflection light from an obstacle 507 in a space to be measured, in the measurement light deflected toward the space to be measured by the transmission/reception mirror 503, is deflected by the transmission/reception mirror 503 toward the light receiving unit. A horizontal plane is scanned with the measurement light by the rotation of the motor 502.

As shown in FIG. 14, a scanning-type distance measuring apparatus 200 described in Japanese Unexamined Patent Publication No. 2006-349449 includes: a light transmitting unit 201, a light receiving unit 202 disposed so as to oppose the light transmitting unit 201 on an optical axis P of measurement light output from the light transmitting unit 201; a cap member 204 driven to be rotated about the optical axis P by a motor 210; a light transmitting mirror 206 disposed on the top face of the upper wall of the cap member 204 at a predetermined tilt angle with respect to the optical axis P and deflecting the measurement light from the light transmitting unit 201 toward a direction perpendicular to the optical axis P; and a light receiving mirror 208 fixed on the under face of the upper wall of the cap member 204 at a predetermined tilt angle with respect to the optical axis P and deflecting reflection light from an obstacle R, in the measurement light output to a space to be measured, toward the light receiving unit 202.

In the laser range finding apparatus disclosed in U.S. Pat. No. 5,455,669, the single light transmission/reception mirror 503 serves as the deflecting mirror that deflects measurement light from the light transmitting unit toward the space to be measured and the deflecting mirror that deflects reflection light from the space to be measured to the light receiving unit, and reflection light having a large diameter is deflected toward the light receiving unit by a periphery part of the mirror. Consequently, the light transmission/reception mirror 503 needs to have a large deflecting face. Further, the light path of guiding reflection light to the light receiving unit is accordingly long, so that the diameter of the light receiving lens 508 is large. There is a problem of difficulty in miniaturization of the apparatus.

In the scanning-type distance measuring apparatus disclosed in Japanese Unexamined Patent Publication No. 2006-349449, the light transmitting mirror 206 and the light receiving mirror 208 are disposed close to each other via the upper wall of the cap member 204. Naturally, the distance between the optical axis of the measurement light deflected by the light transmitting mirror and that of the reflection light incident on the light receiving mirror is short. Consequently, the dead area in a close range can be reduced to the degree at which there is caused no problem in practical use. Further, since the light receiving lens 209 is provided on the light incidence side of the light receiving mirror in the cap member 204, the light receiving mirror can be made small, and the scanning-type distance measuring apparatus can be miniaturized.

However, the light transmitting mirror 206 and the light receiving mirror 208 are separated from each other by the cap member 204 and the light path of the measurement light and that of the reflection light are separated from each other. In a case where a light shield sheet or the like is made to adhere to a transparent window purposely or carelessly, the following problem occurs.

Even when measurement light output from the light transmitting unit 201 is reflected from the light shield sheet, the reflection light is not received by the light receiving unit, so that adhesion of the light shield sheet or the like cannot be detected. Consequently, when the scanning-type distance measuring apparatus is used in a monitor sensor or the like, the reliability cannot be assured.

SUMMARY OF THE INVENTION

In view of the above problem, it is an object of the present invention to provide an inexpensive scanning-type distance measuring apparatus realizing miniaturization and easy detection that an optical window is purposely or carelessly covered with a light shield sheet or the like.

To achieve the object, the present invention provides a scanning-type distance measuring apparatus including: an optical system having a first deflecting member that deflects measurement light output from a light transmitting unit toward a space to be measured, a light receiving lens that condenses reflection light from an object to be measured existing in the space to be measured, and a second deflecting member that deflects the reflection light passed through the light receiving lens toward a light receiving unit disposed so as to oppose the light transmitting unit; and a scanning mechanism that rotates the optical system about a predetermined axis, the apparatus for measuring a distance to the object to be measured on the basis of the measurement light and the reflection light detected by the light receiving unit, wherein an optical member that outputs the measurement light deflected by the first deflecting member from an incident light path of the reflection light to the second deflecting member is provided.

With the configuration, the measurement light deflected by the first deflecting member is output from the incident light path of the reflection light to the second deflecting member. Consequently, even in a case where a light shield sheet or the like is made to adhere to the optical window, a part of the reflection light from the light shield sheet or the like enters the second deflecting member along the incident light path. On the basis of such measurement light and reflection light, existence of a foreign matter such as the light shield sheet in a close range can be reliably detected.

Preferably, a region through which the measurement light passes in the light receiving lens is notched. Since the measurement light deflected by the first deflecting member passes through the notched region in the light receiving lens, the measurement light can be properly output toward the space to be measured without being refracted by the light receiving lens.

Preferably, the optical member is configured by the second deflecting member and the first deflecting member whose deflecting face is extended to a part of a region along the scanning direction in the deflecting face of the second deflecting member. When measurement light output from the region extended to the second deflecting member in the deflecting face of the first deflecting member to the space to be measured is reflected by a foreign matter such as a light shield sheet, a part of the reflection light is incident on a region adjacent to the extended region along the scanning direction in the deflecting face of the second deflecting member. Consequently, the existence of a foreign matter such as a light shield sheet can be reliably detected.

Preferably, the first and second deflecting members are integrally formed. By integrally forming the optical member such that the angle formed by the deflecting face of the first deflecting member and the deflecting face of the second deflecting member is a predetermined angle, it becomes unnecessary to adjust the incidence angle and the reflection angle at the deflecting faces of the measurement light and the reflection light. The scanning-type distance measuring apparatus can be easily and precisely assembled with the smaller number of parts.

Preferably, the optical system is provided with a cylindrical guide member for guiding measurement light deflected by the first deflecting member to the space to be measured. Since the measurement light deflected by the first deflecting member is guided to the space to be measured through the inside of the cylindrical guide member, solved is an inconvenience such that a stray ray generated by reflection, inside the apparatus, of a part of the measurement light output from the light transmitting unit is erroneously detected by the light receiving unit.

Preferably, the optical member is a third deflecting member having two deflecting faces for making measurement light deflected by the first deflecting member translate so as to output from the incident light path of the reflection light to the second deflecting member.

With the configuration, the optical axis of the measurement light deflected by the first deflecting member toward the space to be measured is deflected by the two deflecting faces of the third deflecting member, and the measurement light is translated so as to be output from the incident light path of the reflection light to the second deflecting member.

Preferably, the third deflecting member is disposed in the notch in the light receiving lens. Since the measurement light deflected by the first deflecting member passes through the third deflecting member disposed in the notch in the light receiving lens, the measurement light can be properly output toward the space to be measured without being refracted by the light receiving lens.

DESCRIPTION OF THE PREFERRED EMBODIMENTS

A scanning-type distance measuring apparatus according to a first embodiment of the present invention is described below.

Figure 1B:
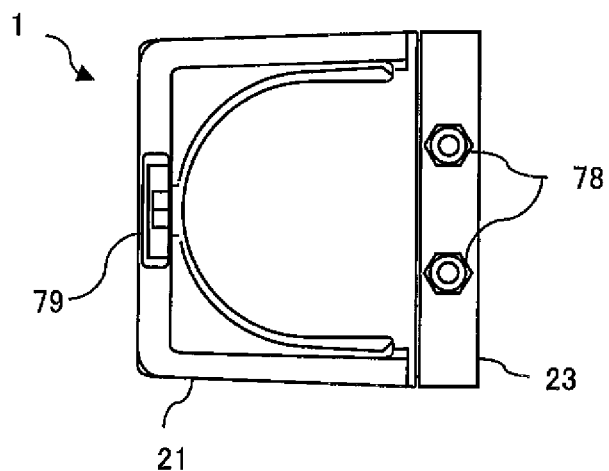
FIGS. 1A, 1B, and 1C are a front view, a plan view, and a side view, respectively, showing the appearance of a scanning-type distance measuring apparatus according to the present invention.
Figures 1A, 1C:
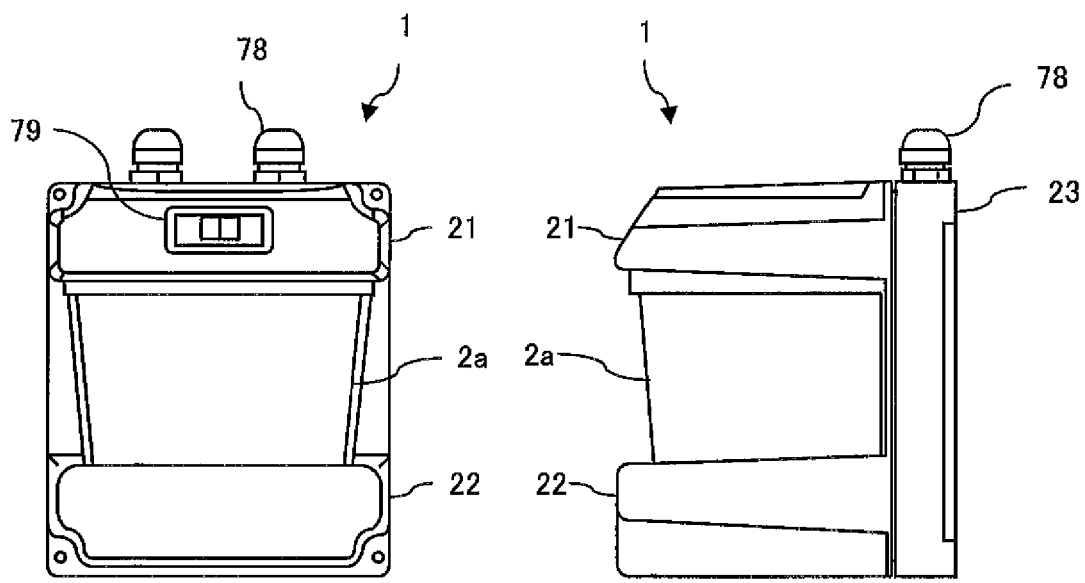

As shown in FIGS. 1A to 1C, in a scanning-type distance measuring apparatus 1 according to the present invention, a light-transmissive optical window 2a formed in a curved plane having an almost semicircular shape in cross section is disposed between an upper housing 21 and a lower housing 22, and a monitor display unit 79 by which the state of the apparatus 1 can be determined is provided on the front face of the upper housing 21.

To the top face of a rear housing 23 disposed so as to oppose the optical window 2a, a pair of cable clamps 78 for connecting signal cables for taking distance information detected by the scanning-type distance measuring apparatus 1 to the outside are attached.

Figure 11A:
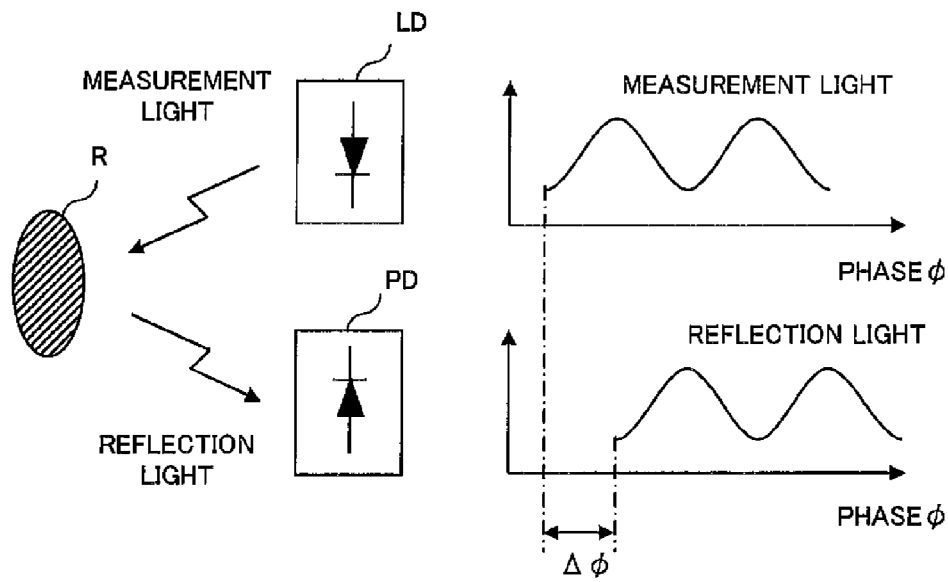
FIG. 11A is an explanatory diagram of the measurement principle of a scanning-type distance measuring apparatus employing the AM method.
Figure 11B:
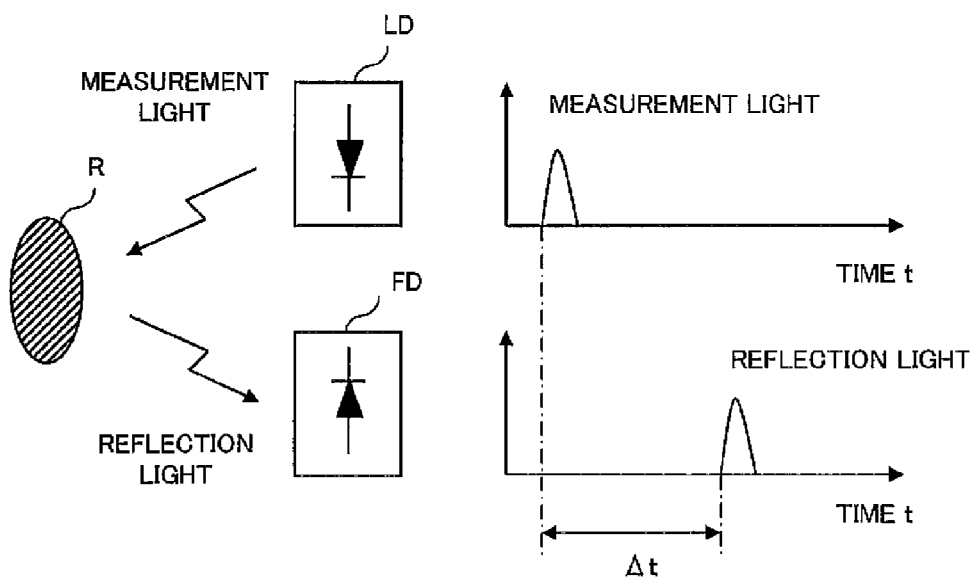
FIG. 11B is an explanatory diagram of the measurement principle of a scanning-type distance measuring apparatus employing the TOF method.

As shown in FIGS. 11A and 11B, the scanning-type distance measuring apparatus 1 modulates measurement light output from a light source LD such as a laser, irradiates an object R with the modulated light via the optical window 2a, and detects reflection light from the object R by a light receiving device PD via the optical window 2a in order to measure the distance. Two methods of modulating the measurement light, namely, the AM (Amplitude Modulation) method and the TOF (Time of Flight) method are practically used.

As shown in FIG. 11A and mathematical formula 1, the AM method includes photoelectrically converting measurement light subjected to amplitude modulation with sine wave and reflection light of the measurement light, calculating a phase difference $\Delta\phi$ of signals thereof, and computing a distance L from the phase difference $\Delta\phi$.

As shown in FIG. 11B and mathematical formula 2, the TOF method includes photoelectrically converting measurement light which is modulated in pulses and reflection light of the measurement light, and computing a distance L from delay time $\Delta t$ between signals thereof.

$$L = \Delta\phi \cdot C/(4\pi \cdot f) \qquad \text{Mathematical formula 1}$$

$$L = \Delta t \cdot C/2 \qquad \text{Mathematical formula 2}$$

where L denotes a distance to an object, C denotes a light speed, f denotes a modulation frequency, $\Delta\phi$ indicates a phase difference, and $\Delta t$ indicates delay time.

The scanning-type distance measuring apparatus 1 to which the present invention is applied can employ any of the methods described above.

Figure 2:
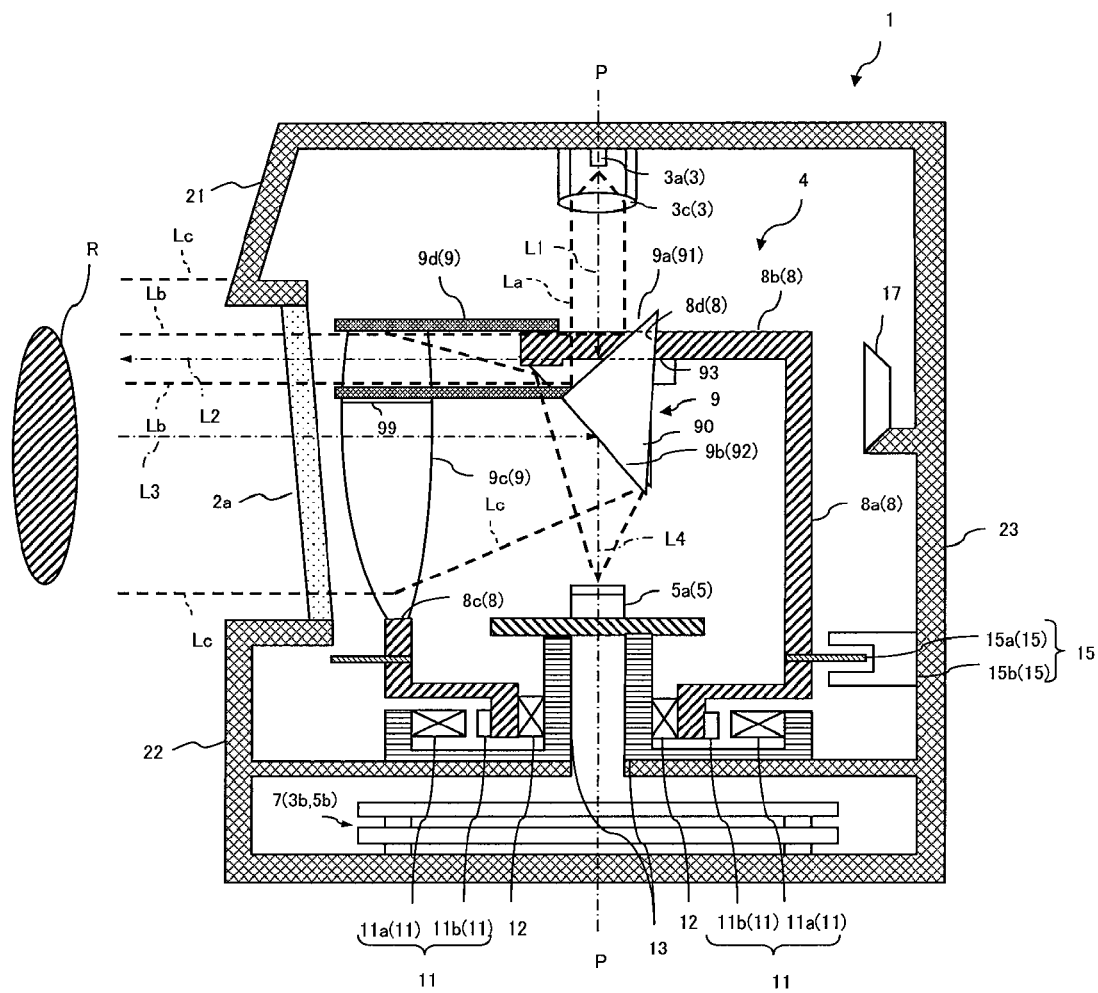
FIG. 2 is a schematic longitudinal sectional view showing the scanning-type distance measuring apparatus according to a first embodiment of the present invention.
Figure 3:
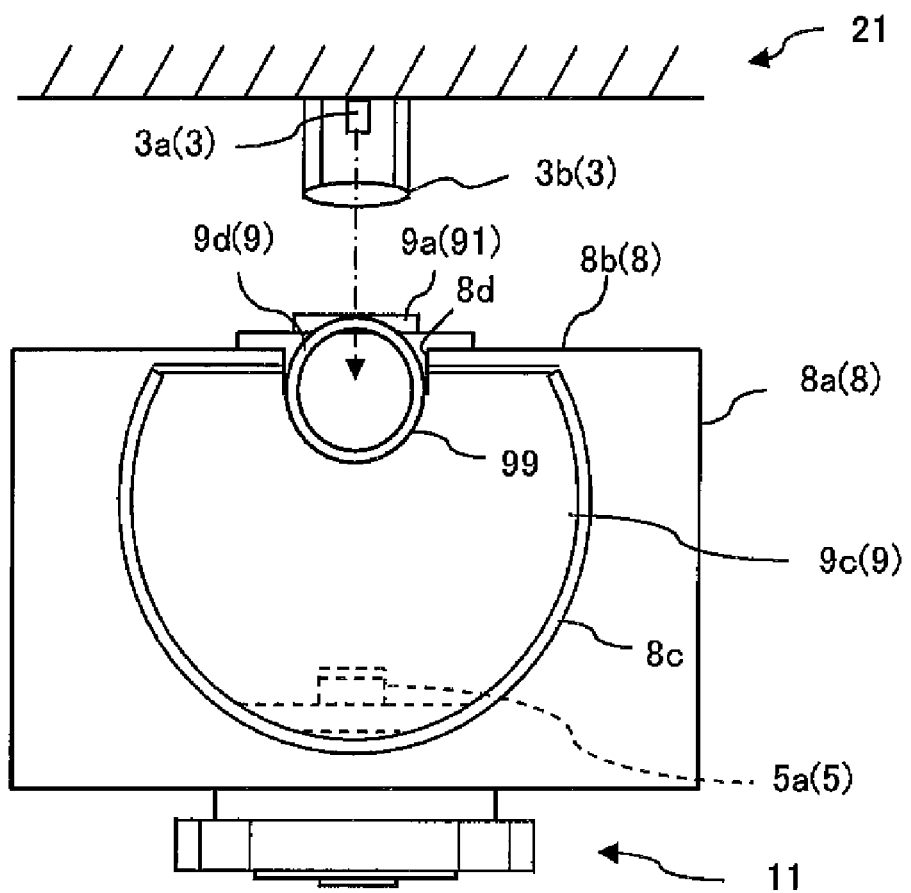
FIG. 3 is a front view of a main part of the scanning-type distance measuring apparatus according to the first embodiment of the present invention.

As shown in FIGS. 2 and 3, in the scanning-type distance measuring apparatus 1, a light transmitting unit 3 that outputs measurement light and a light receiving unit 5 that detects reflection light are disposed so as to oppose each other along an optical axis L1 in the housings 21, 22, and 23 whose inner wall faces are covered with a light absorption member such as a black-out curtain absorbing stray rays, and a scanning mechanism 4 that rotary-scans a plane with the measurement light is disposed between the light transmitting unit 3 and the light receiving unit 5.

The scanning mechanism 4 includes: a cylindrical rotator 8 that rotates an optical system 9 about a rotation axis P matching the optical axis L1 connecting the light transmitting unit 3 and the light receiving unit 5; and a motor 11 that drives to rotate the rotator 8.

The rotator 8 has a cylindrical peripheral wall 8a and a top plate 8b, and is rotatably supported by a hollow shaft 13 via a bearing 12 provided on an inner peripheral wall.

The motor 11 is configured by a rotor made by a magnet 11b attached to an outer peripheral face of the peripheral wall 8a whose lower end is tapered and a stator made by a coil 11a disposed on the casing side. By the interaction of the coil 11a and the magnet 11b, the rotor 8 can rotate about the rotation axis P.

The light transmitting unit 3 has a light emitting device 3a using a semiconductor laser and a drive circuit 3b for the light emitting device 3a. The light emitting device 3a is fixed to the upper housing 21 such that the optical axis L1 of measurement light output from the light emitting device 3a and the axis P coincide with each other, and an optical lens 3c that makes the diameter of a beam constant is disposed on the optical axis L1.

The light receiving unit 5 includes a light receiving device 5a made by an avalanche photodiode fixed in the rotator 8 so as to oppose the light transmitting unit 3 while sandwiching the scanning mechanism 4 on the rotation axis P and detecting reflection light, and an amplification circuit 5b that amplifies a reflection signal subjected to photoelectric conversion in the light receiving device 5a.

Attached to the rotator 8 is an optical system 9 having a first deflecting mirror 9a as a first deflecting member, a light receiving lens 9c, and a second deflecting mirror 9b as a second deflecting member.

The first deflecting mirror 9a deflects measurement light output from the light transmitting unit 3 along the optical axis L1 by 90 degrees toward the space to be measured. The light receiving lens 9c condenses reflection light from the object R to be measured existing in the space to be measured. The second deflecting mirror 9b deflects the reflection light passed through the light receiving lens 9c by 90 degrees toward the light receiving unit 5 that is disposed opposite to the light transmitting unit 3 along the optical axis L1.

Specifically, the measurement light emitted in a light path La which is along the optical axis L1 from the light transmitting unit 3 is deflected by the first deflecting mirror 9a into a light path Lb which is along an optical axis L2 perpendicular to the optical axis L1. Thereafter, the deflected light passes through the optical window 2a and enters the space to be measured. The reflection light from the object to be measured, which passed through the optical window 2a in a light path Lc which is along an optical axis L3 parallel to the optical axis L2 is converged by the light receiving lens 9c, deflected by the second deflecting mirror 9b into an optical axis L4 which is the same as the optical axis L1, and guided to the light receiving unit 5.

An opening 8c to which the light receiving lens 9c is attached is formed in a part of the peripheral wall 8a of the rotator 8, and a notch 8d to which the deflecting mirrors 9a and 9b are attached is formed in the top plate 8b.

Figure 4A:
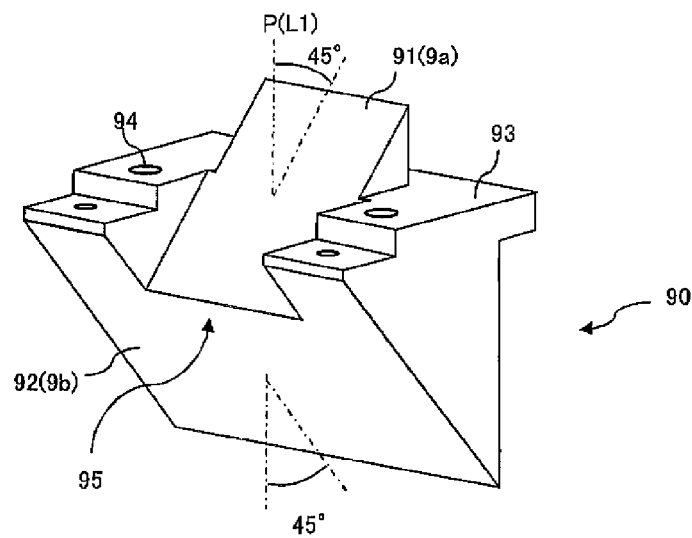
FIG. 4A is a perspective view of an optical member according to the first embodiment.

As shown in FIG. 4A, on two orthogonal planes of an optical member 90 integrally formed by resin or optical glass, there are formed deflecting faces 91 and 92 coated with gold or aluminum as a reflecting member. The first deflecting face 91 serves as the first deflecting mirror 9a that deflects measurement light by 90 degrees with respect to the optical axis L1 toward the region to be measured, and the second deflecting face 92 serves as the second deflecting mirror 9b that deflects reflection light by 90 degrees toward the light receiving unit 5 along the optical axis L4.

A center part of the upper-end of the second deflecting mirror 9b is notched, and the first deflecting mirror 9a is formed so as to extend in the notch 95. A reference face 93 regulating the posture of the rotator 8 attached to the top plate 8b is formed to occupy both sides of the first deflecting mirror 91. Formed in the reference face 93 are attachment holes 94 each having a spiral groove formed in the inner peripheral face.

As shown in FIGS. 2 and 3, the deflecting mirrors 9a and 9b which are integrally formed are inserted from the opening 8c formed in the rotator 8 toward the notch 8d, the peripheral face of the notch 8d formed in the top plate 8b and the reference face 93 are joined together, and further, a screw is screwed in each of the attachment holes 94, thereby fixing the deflecting mirrors 9a and 9b to the rotator 8. Thereafter, the light receiving lens 9c is fixed in the opening 8c.

Apart upper side of the center of the light receiving lens 9*c* is linearly cut and a notch 99 obtained by cutting a center portion in a circular arc shape in the lens center direction is formed. A hollow cylindrical guide member 9*d* for guiding the measurement light deflected by the first deflecting mirror 9*a* to the space to be measured is fixed to the notch 8*d* formed in the top plate 8*b* of the rotator 8 and is disposed such that the tip end of the guide member 9*d* extends from the notch 99 formed in the light receiving lens 9*c*, and the root end of the guide member 9*d* is disposed so as to come into contact with the lower end of the first deflecting mirror 9*a*. That is, a region through which measurement light passes is notched in the light receiving lens 9*c*.

The outer periphery of the guide member 9*d* is covered with a light shield member, and measurement light deflected by the first deflecting mirror 9*a* passes through the guide member 9*d* and is guided to the space to be measured. Therefore solved is an inconvenience such that measurement light output from the light transmitting unit 3 is leaked to the inside of the rotator 8 and erroneously detected as a stray ray by the light receiving unit 5.

The optical window 2*a* provided between the upper and lower housings 21 and 22 has a predetermined width in the vertical direction such that the measurement light output from the light transmitting unit 3 is made to enter the space to be measured by the scanning mechanism 4 and reflection light from the object R to be measured which exists in the space to be measured is detected by the light receiving unit 5. The optical window 2*a* is disposed slightly tilted from the upper end to the lower end toward the rear side so that the measurement light can scan in the range of about 250 degrees around the rotation axis P as a center. With the configuration, while preventing dusts and the like from being deposited on the surface of the optical window 2*a*, space in a wide-range can be scanned.

Figure 12:
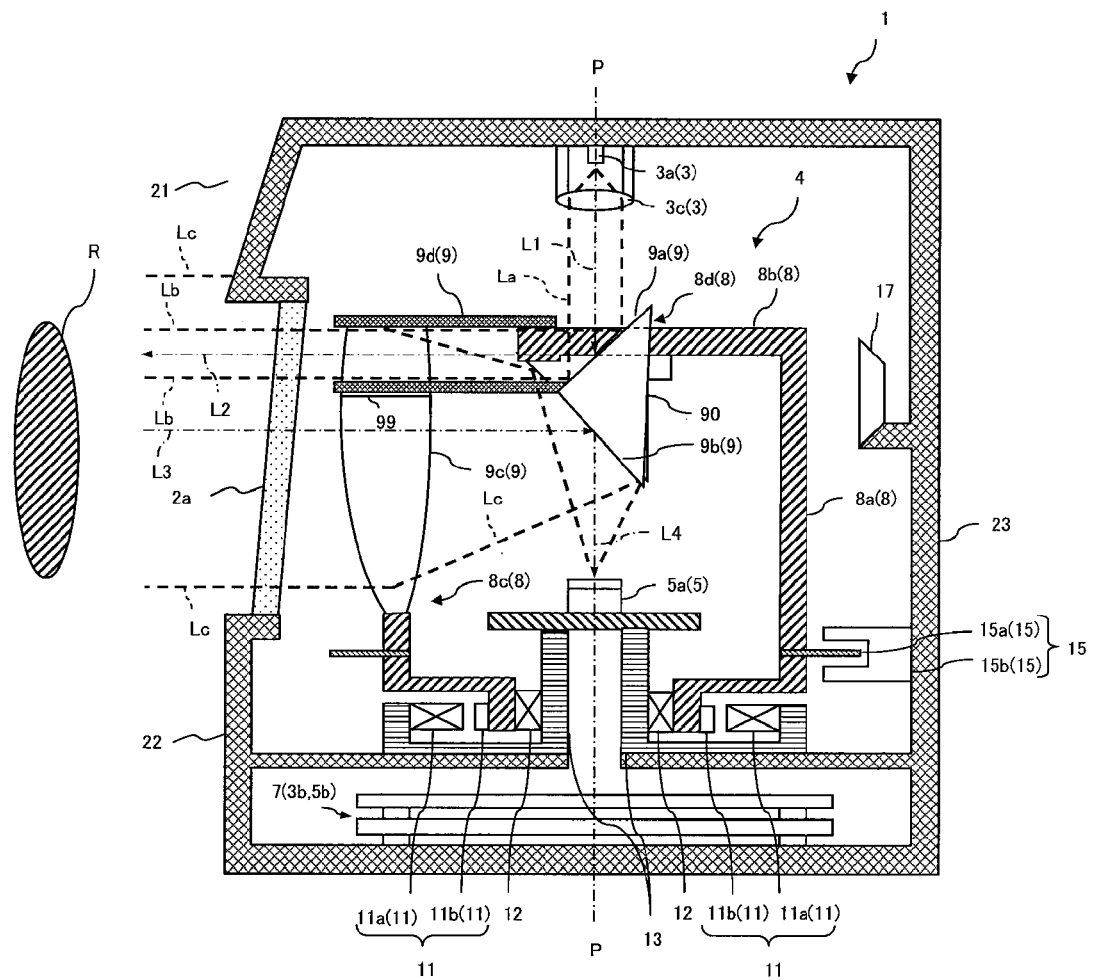
FIG. 12 is a schematic longitudinal sectional view showing a scanning-type distance measuring apparatus according to another embodiment of the present invention.
Figure 13:
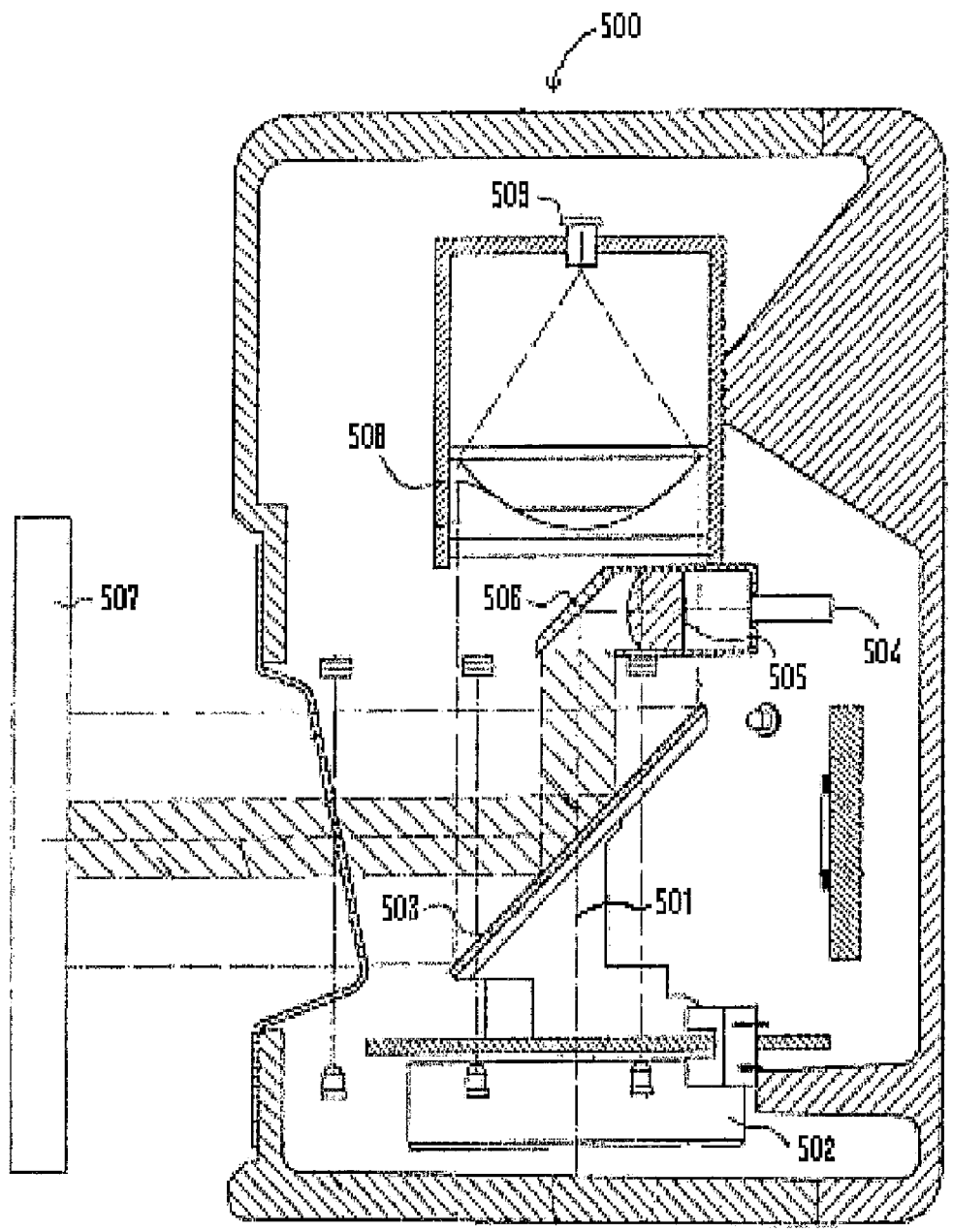
FIG. 13 is a schematic longitudinal sectional view of a conventional scanning-type distance measuring apparatus.
Figure 14:
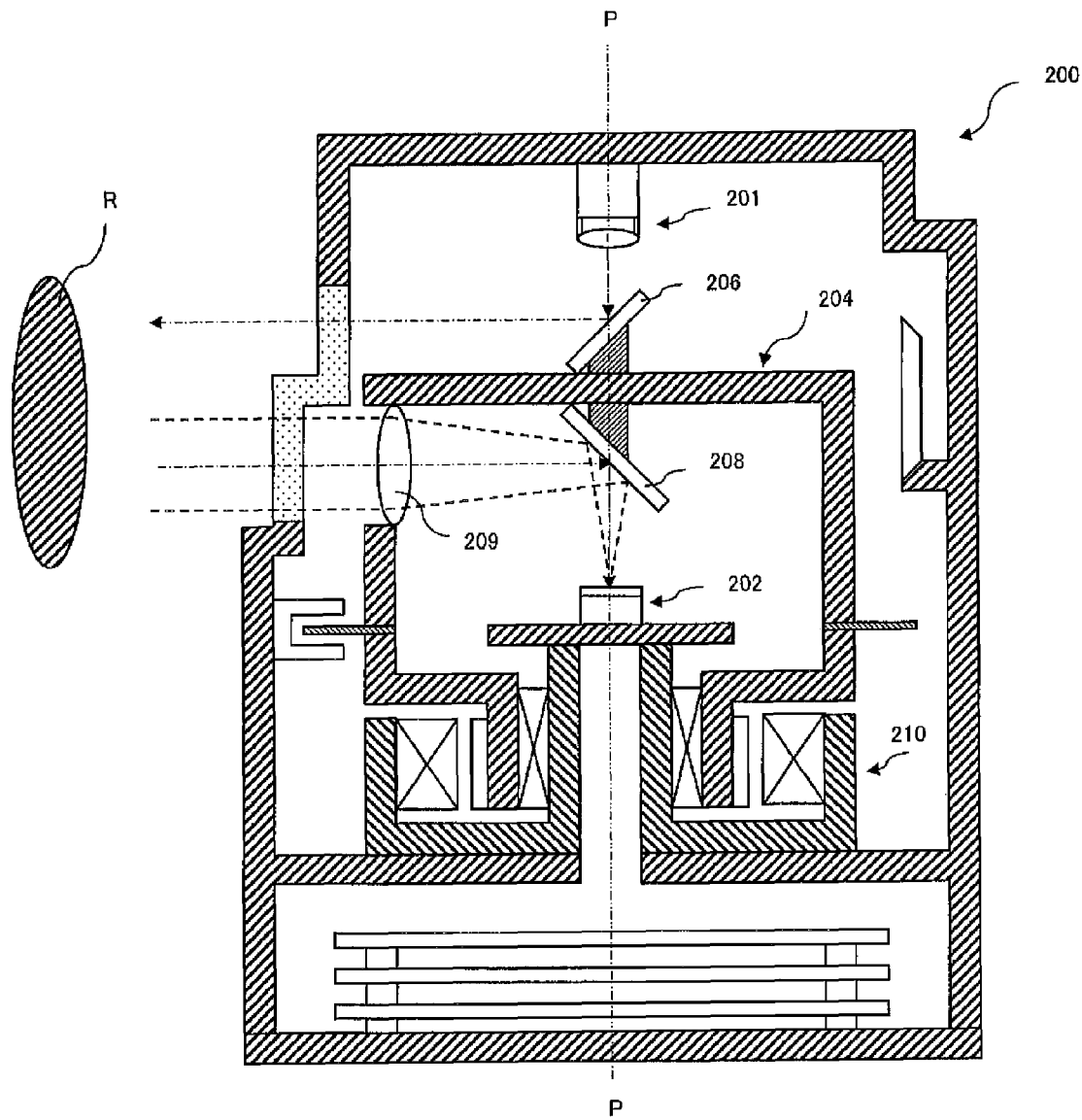
FIG. 14 is a schematic longitudinal sectional view of another conventional scanning-type distance measuring apparatus.

As shown in FIG. 12, the optical window 2*a* may be disposed slightly tilted from the lower end to the upper end toward the rear side. The tilt angle of the optical window 2*a* and the scan angle around the rotation axis P as a center are properly set according to the position of the scanning-type distance measuring apparatus mounted and according to the purpose of use.

As shown in FIG. 2, when the optical member 90 described above is employed, measurement light deflected by the first deflecting mirror 9*a* is output from the incident light path Lc of reflection light to the second deflecting mirror 9*b*.

Therefore, even in a case where a light shield sheet or the like is made to adhere to the periphery of the optical window 2*a* purposely or carelessly, a part of the reflection light from the light shield sheet or the like is incident on the second deflecting mirror 9*b* along the incident light path Lc. On the basis of such measurement light and reflection light, the existence of a foreign matter such as the light shield sheet in a close range can be detected reliably.

Figure 5:
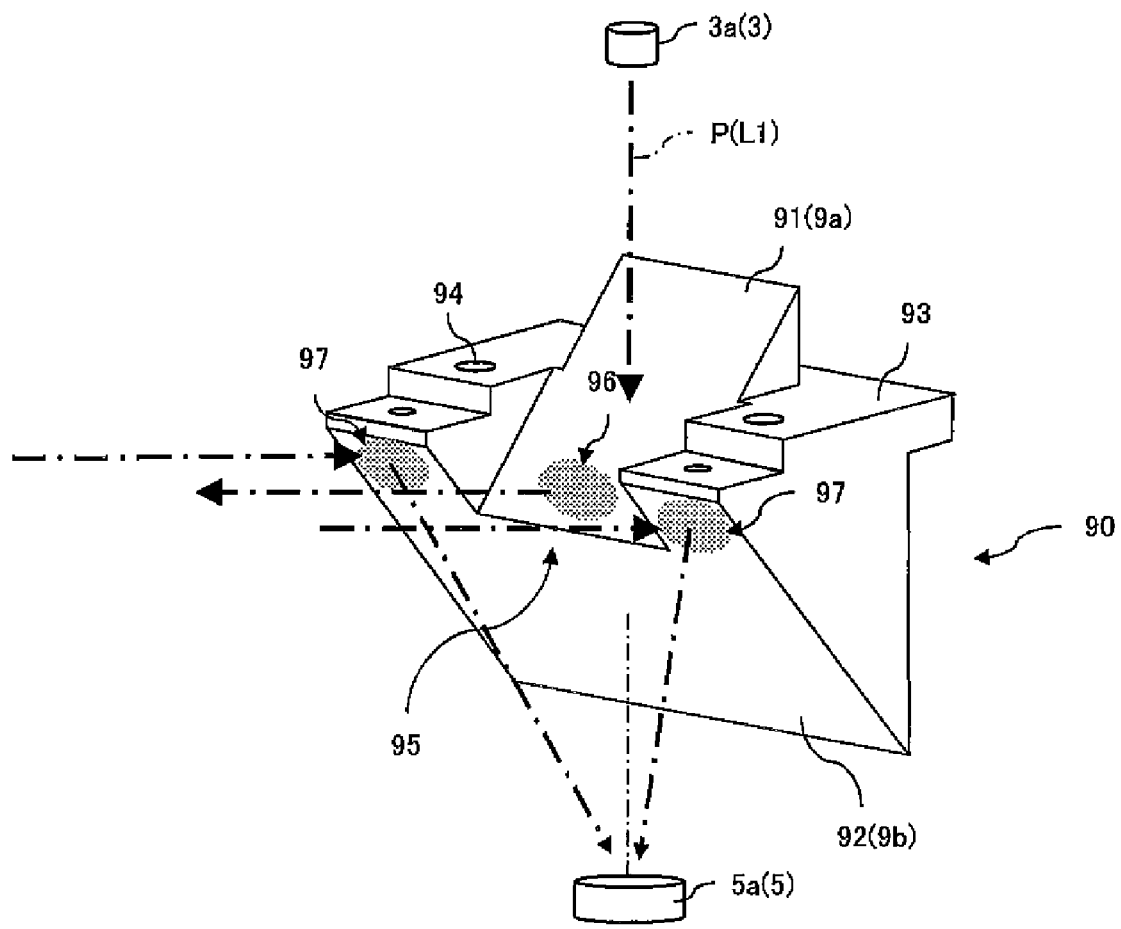
FIG. 5 is an explanatory diagram of a light path of measurement light and a light path of reflection light of the optical member shown in FIG. 4A.

FIG. 5 specifically shows this state. When measurement light output to the space to be measured from an extended region 96 toward the second deflecting mirror 9*b*, in the deflecting face of the first deflecting mirror 9*a*, is reflected by a foreign matter such as a light shield sheet, a part of the reflection light enters a region 97 adjacent to the extended region 96 along the scan direction, in the deflecting face of the second deflecting mirror 9*b*. Consequently, the existence of the foreign matter such as a light shield sheet can be detected.

The position of the notch 95 formed in the second deflecting mirror 9*b* is not limited to the center portion on the upper end side but may be formed at an end on the upper end side of the second deflecting mirror 9*b* as long as the light path Lb of the measurement light is formed such that the measurement light is output from the incident light path Lc of reflection light to the second deflecting mirror 9*b*.

Specifically, the above optical member 90, which is configured by the second deflecting mirror 9*b* and the first deflecting mirror 9*a* whose deflecting face is extended to a part of the region along the scan direction in the deflecting face of the second deflecting mirror 9*b*, corresponds to the characteristic part of the present invention. The optical member 90 outputs measurement light, which is deflected by the first deflecting member (the first deflecting mirror 9*a*), from the incident light path Lc of the reflection light to the second deflecting member (the second deflecting mirror 9*b*) having the deflecting face mounted at an angle different from that of the deflecting face of the first deflecting member (the first deflecting mirror 9*a*).

Figure 4B:
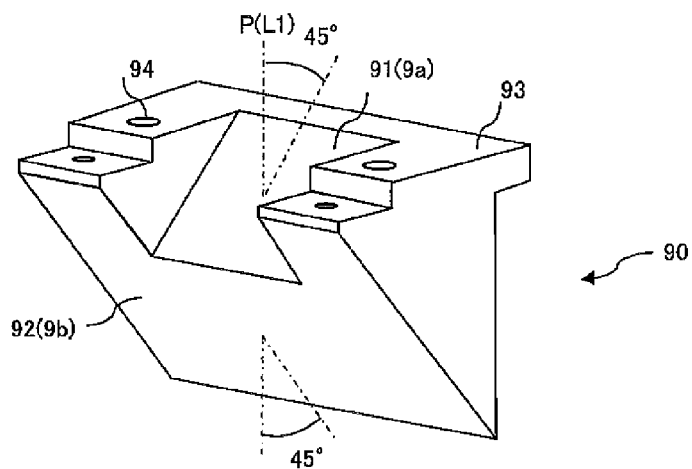
FIG. 4B is a perspective view of an optical member according to another embodiment.
Figure 4C:
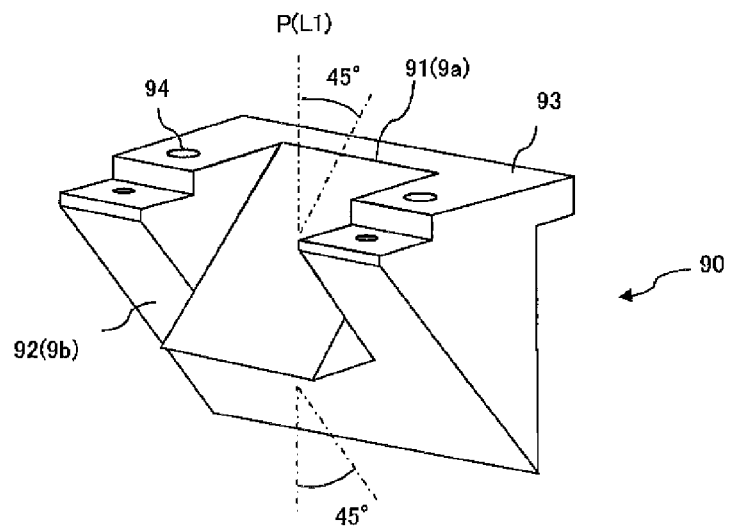
FIG. 4C is a perspective view of an optical member according to further another embodiment.

The optical member 90 is not limited to that illustrated in FIG. 4A but may be formed such that the upper edge of the first deflecting mirror 9*a* is flush with the reference face 93 as shown in FIG. 4B, or such that the upper edge of the first deflecting mirror 9*a* is flush with the reference face 93 and the lower edge of the first deflecting mirror 9*a* is projected from the deflecting face of the second deflecting mirror 9*b* as shown in FIG. 4C. In any of these cases, it is sufficient for the optical member 90 to have a face capable of deflecting measurement light in the light path La output from the light transmitting unit 3 along the optical axis L1, to a direction perpendicular to the optical axis L1.

As shown in FIG. 2, a slit plate 15*a* in which a plurality of optical slits are formed in the circumferential direction is mounted on the outer peripheral face of the rotator 8, and a photo interrupter 15*b* is disposed on the rotation path of the slit plate 15*a*, which configure a scan angle detecting unit 15 that detects the scan angle of the rotator 8.

On the lower housing 22, a signal processing substrate 7 is disposed. The signal processing substrate 7 has a control function of rotating the scanning mechanism 4 and driving the light emitting device 3*a*, and a computing function of calculating a distance to the object to be measured on the basis of a reflection signal detected by the light receiving unit 5.

In the signal processing substrate 7, the rotation angle of the scanning mechanism 4 is calculated on the basis of a pulse signal input from the scan angle detecting unit 15, and the direction of the position of the object to be measured corresponding to the reflection light is grasped.

A light guiding member 17 such as a prism that guides reference light for correcting the distance calculated in the signal processing substrate 7 is disposed on the inner wall of the rear housing 23 opposing the optical window 2*a*.

Each time the scanning mechanism 4 makes a scan with measurement light, on the basis of reference light directly incident on the light receiving unit 5 from the light transmitting unit 3 via the light guiding member 17, a reference distance from the light transmitting unit 3 to the light receiving unit 5 in the distance measuring apparatus is calculated. On the basis of the calculated reference distance, the distance calculated on the basis of reflection light from the object in the space to be measured is corrected.

An output signal line from the light receiving unit 5 is inserted through the inner space of the hollow shaft 13 and is connected to the signal processing substrate 7.

Next described is a scanning-type distance measuring apparatus according to a second embodiment of the present invention.

The second embodiment is different from the first embodiment described above in the configuration of the optical member 90. In the following, the configuration of the optical member 90 making a difference will be mainly described. The same reference signs are denoted to the common components and detailed description thereof will not be repeated.

Figure 6:
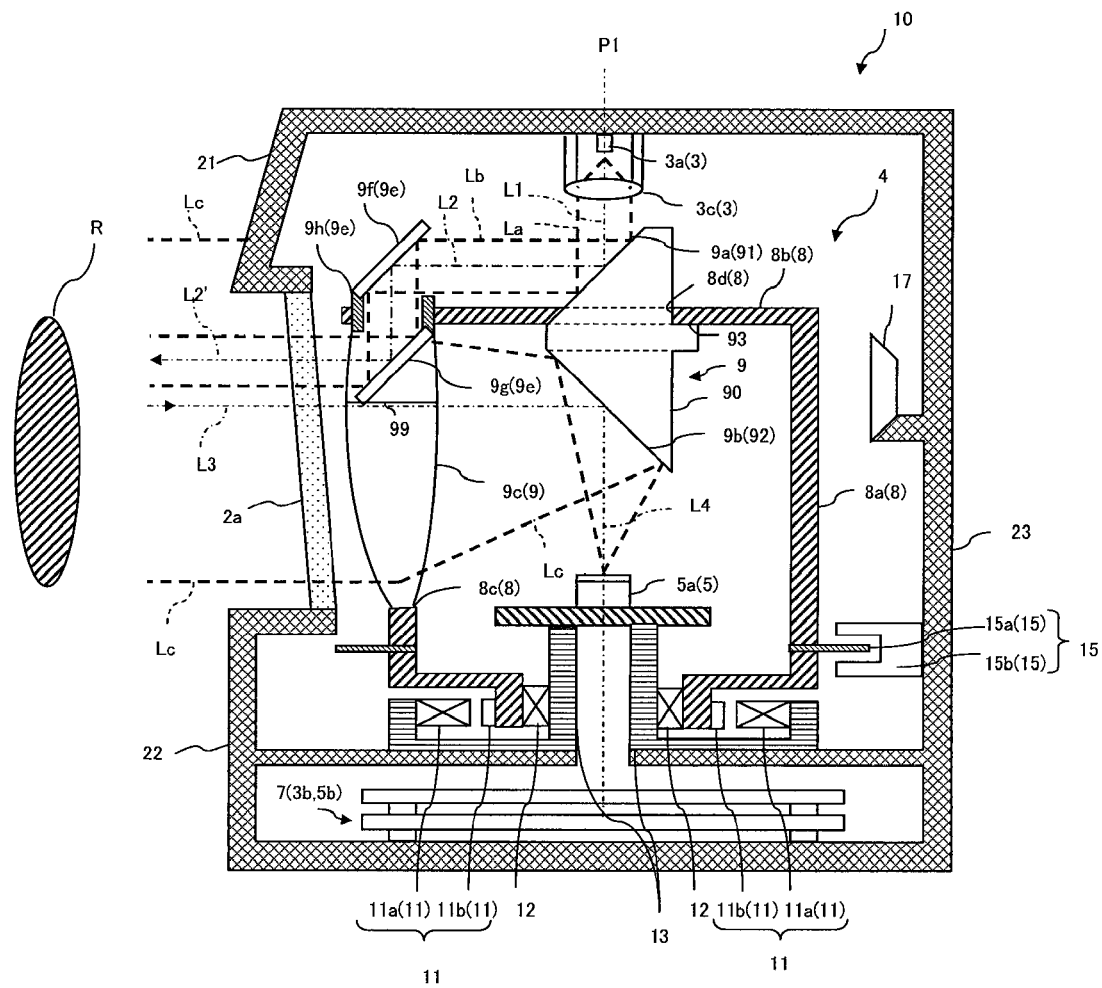
FIG. 6 is a schematic longitudinal sectional view showing a scanning-type distance measuring apparatus according to a second embodiment of the present invention.
Figure 7:
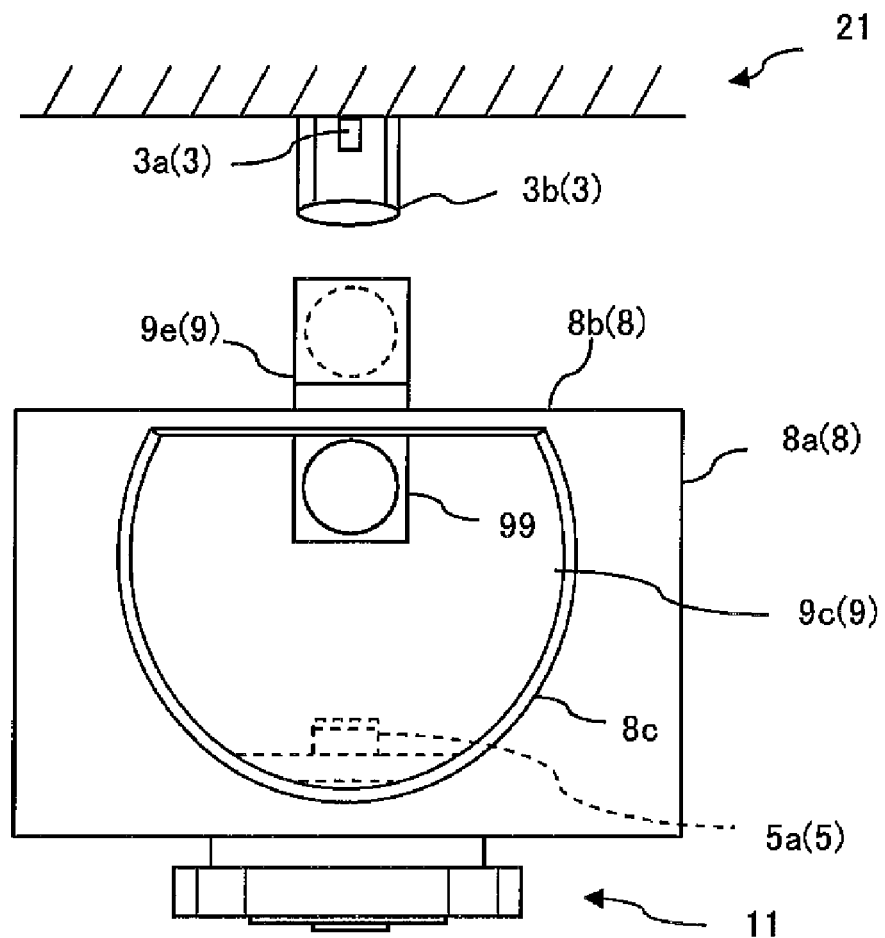
FIG. 7 is a front view of a main part of the scanning-type distance measuring apparatus according to the second embodiment of the present invention.

As shown in FIGS. 6 and 7, to the rotator 8 incorporated in a scanning-type distance measuring apparatus 10, the optical system 9 is attached. The optical system 9 includes: the first deflecting mirror 9a as a first deflecting member that deflects, by 90 degrees toward the space to be measured, measurement light output along the optical axis L1 from the light transmitting unit 3; the light receiving lens 9c that condenses reflection light from the object R to be measured existing in the space to be measured; and the second deflecting mirror 9b as a second deflecting member that deflects the reflection light passed through the light receiving lens 9c by 90 degrees toward the light receiving unit 5 disposed opposite to the light transmitting unit 3 along the optical axis L1.

There are formed the deflecting faces 91 and 92 obtained by coating two orthogonal planes of the optical member 90, integrally formed by resin or optical glass, with gold or aluminum as a reflecting member. The first deflecting face 91 serves as the first deflecting mirror 9a that deflects measurement light by 90 degrees toward the region to be measured with respect to the optical axis L1. The second deflecting face 92 serves as the second deflecting mirror 9b that deflects reflection light by 90 degrees toward the light receiving unit 5 along the extension line of the optical axis L1.

On both side faces sandwiching the deflecting faces 91 and 92 of the optical member 90, the reference face 93 regulating the posture of the rotator 8 attached to the top plate 8b is formed so as to be extended. Formed in the reference face 93 is an attachment hole having a spiral groove provided in the inner peripheral face.

The deflecting mirrors 9a and 9b which are integrally formed are inserted from the opening 8c formed in the rotator 8 toward the notch 8d, the peripheral face of the notch 8d formed in the top plate 8b and the reference face 93 described above are joined together, and further a screw is screwed in the attachment hole, thereby fixing the deflecting mirrors 9a and 9b to the rotator 8. Thereafter, the light receiving lens 9c is fixed in the opening 8c.

Apart of the upper side of the center of the light receiving lens 9c is linearly cut and the notch 99 obtained by partially cutting the center portion in the center direction of the lens is formed. A third deflecting member 9e is fixed in a notch 8e formed in the top plate 8b of the rotator 8. One end of the third deflecting member 9e is fit in the notch 99 formed in the light receiving lens 9c.

The third deflecting member 9e has two deflecting mirrors 9f and 9g which make measurement light deflected by the first deflecting mirror 9a translate so as to be output from the incident light path Lc of reflection light toward the second deflecting mirror 9b, and a mirror holder 9h whose outer periphery is covered with a light shield member. Obviously, the angle of the deflecting face of the first deflecting mirror 9a and that of the deflecting face of the second deflecting mirror 9b are different from each other.

The deflecting mirrors 9f and 9g are disposed so that the deflecting faces oppose each other, and are held by the mirror holder 9h, which has the outer periphery covered with a light shield member, so as to be tilted by 45 degrees from the optical axis L2.

The measurement light deflected by the first deflecting mirror 9a into the optical axis L2 perpendicular to the optical axis L1 is deflected by the third deflecting mirror 9f so as to be along an optical axis parallel to the optical axis L1, and further deflected by the fourth deflecting mirror 9g into an optical axis L2' parallel to the optical axis L2.

Specifically, the third deflecting member 9e configures the optical member that outputs measurement light deflected by the first deflecting member (the first deflecting mirror 9a) from the incident light path Lc of reflection light toward the second deflecting member (the second deflecting mirror 9b) having the deflecting face mounted at an angle different from that of the deflecting face of the first deflecting member (the first deflecting mirror 9a).

Therefore, the measurement light deflected by the first deflecting mirror 9a is output from the incident light path Lc of reflection light toward the second deflecting mirror 9b mounted at the angle different from that of the first deflecting mirror 9a.

Even in a case where a light shield sheet or the like is made to adhere to the periphery of the optical window 2a purposely or carelessly, a part of reflection light from the light shield sheet or the like is incident on the second deflecting mirror 9b along the incident light path Lc. Therefore, on the basis of such measurement light and reflection light, the existence of a foreign matter such as the light shield sheet in a close range can be detected reliably.

Figure 8:
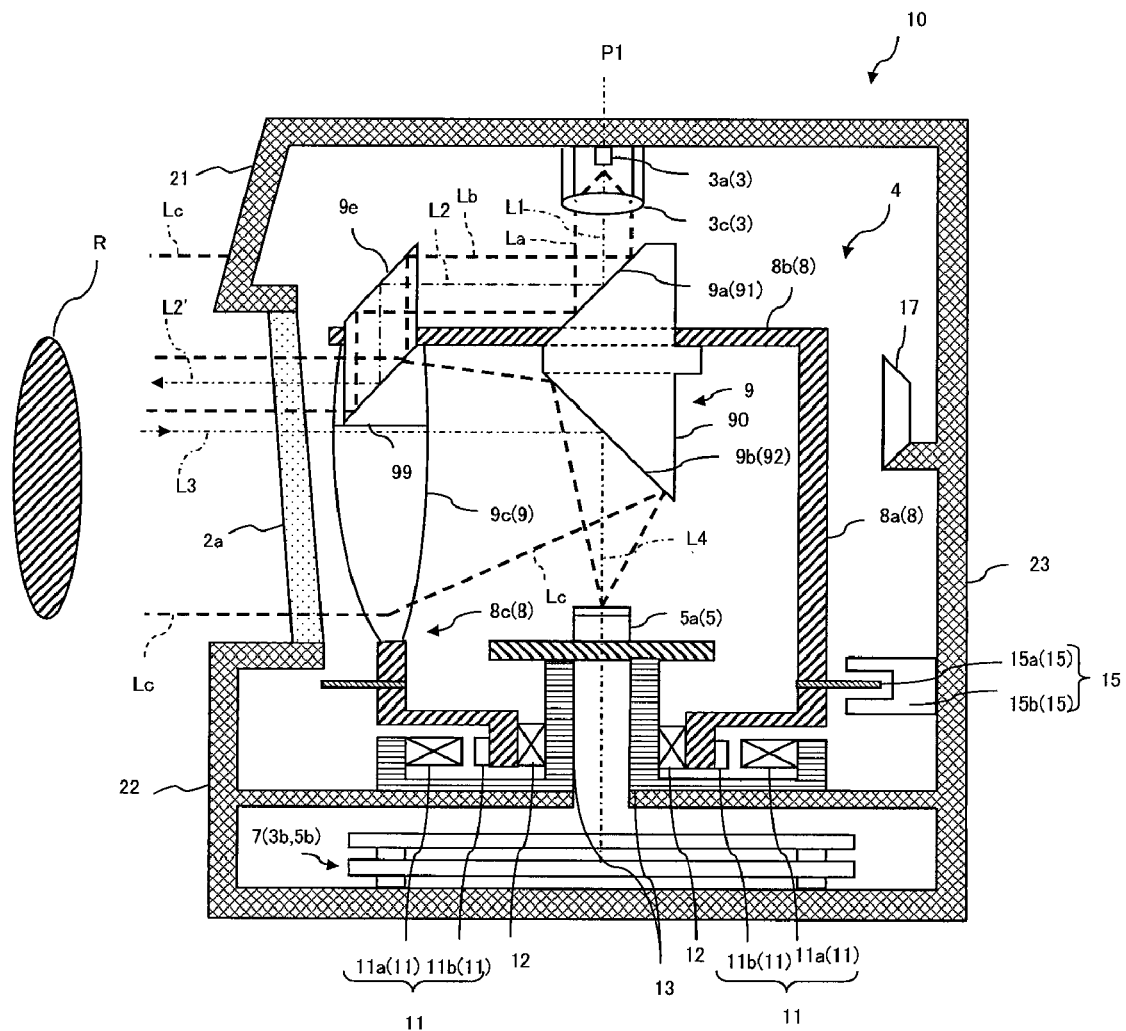
FIG. 8 is a front view of a main part of the scanning-type distance measuring apparatus according another embodiment of to the present invention.

The third deflecting member 9e is configured by the pair of deflecting mirrors 9f and 9g that are held by the mirror holder 9h as described in the foregoing embodiments. Alternatively, as shown in FIG. 8, the third deflecting member 9e may be configured by a prism whose deflecting faces oppose each other and are tilted by 45 degrees from the optical axis L2.

Although it is desirable that the first and second deflecting mirrors 9a and 9b are integrally formed in view of precise attachment and the like, they do not have to be necessarily integrally formed. Alternatively, the first and second deflecting mirrors 9a and 9b may be configured by different members as long as they are attached to the top plate 8b of the rotator 8 at predetermined angles.

Described in the following is a computing process for measuring a distance to an object to be measured on the basis of measurement light and reflection light using the signal processing substrate 7 incorporated in the scanning-type distance measuring apparatus 1 or 10 according to the first or second embodiment.

The signal processing substrate 7 is provided with a signal process circuit 70 of the TOF method of calculating a distance to the object to be measured on the basis of reference light detected by the light receiving unit 5 synchronously with the timing of outputting measurement light.

Figure 9:
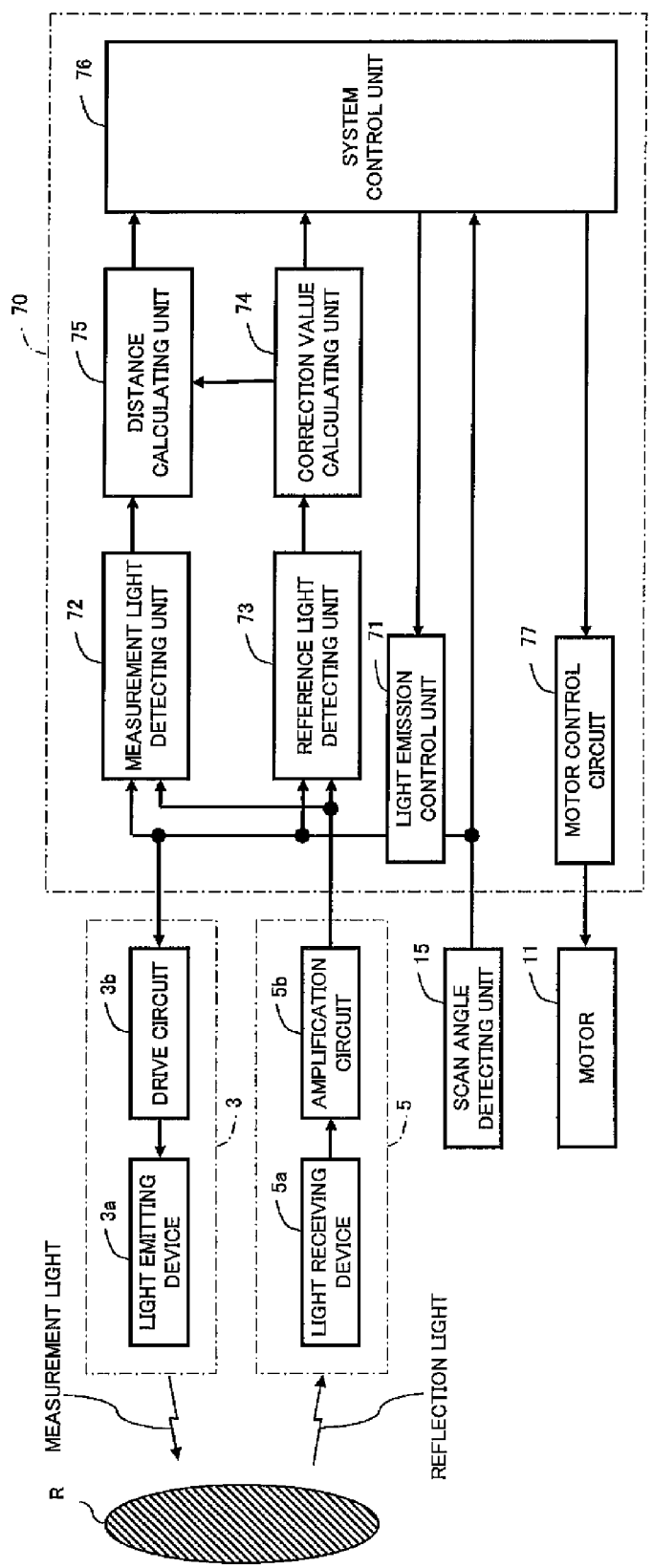
FIG. 9 is a block configuration diagram of a signal processing circuit of the scanning-type distance measuring apparatus according to the present invention.

As shown in FIG. 9, the signal process circuit 70 includes a light emission control unit 71, a measurement light detecting unit 72, a reference light detecting unit 73, a correction value calculating unit 74, a distance calculating unit 75, and a system control unit 76.

On the basis of an angle signal indicative of the scan angle output from the scan angle detecting unit 15, the light emission control unit 71 outputs a light emission drive signal synchronized with the angle signal.

When the scanning mechanism 4 is not located at a reference rotation position at which the measurement light is incident on the light guiding member 17, the measurement light detecting unit 72 detects an electric signal output from the light receiving unit 5 as a measurement light signal.

When the scanning mechanism 4 is located at the reference rotation position, the reference light detecting unit 73 detects an electric signal output from the light receiving unit 5 as a reference light signal.

The correction value calculating unit 74 calculates a correction value for a measurement distance between the scanning-type distance measuring apparatus and the object to be measured on the basis of the reference light signal detected by the reference light detecting unit 73.

The distance calculating unit 75 calculates a measurement distance on the basis of the measurement light signal detected by the measurement light detecting unit 72 and calculates a final measurement distance on the basis of the measurement distance and the correction value.

The system control unit 76 computes the position of the object to be measured on the basis of the angle signal and the final measurement distance and outputs it.

When the power of the system is turned on, a motor drive signal is output from the system control unit 76 to a motor control circuit 77, and the motor 11 is driven by the motor control circuit 77 at a predetermined speed.

A pulse signal output from the scan angle detecting unit 15 in accordance with rotation of the driven motor is input to the light emission control unit 71. On the basis of the pulse signal, the light emission control unit 71 grasps the output direction of the measurement light by the scanning mechanism 4.

The interval of the slits provided in the slit plate 15a configuring the scan angle detecting unit 15 is set so as to be different from the other rotation position at the preliminarily set reference rotation position of the rotator. On the basis of the waveform of the pulse signal, the reference rotation position is detected. By counting the number of pulses from the reference rotation position, the rotation angle from the reference rotation position is calculated.

Figure 10:
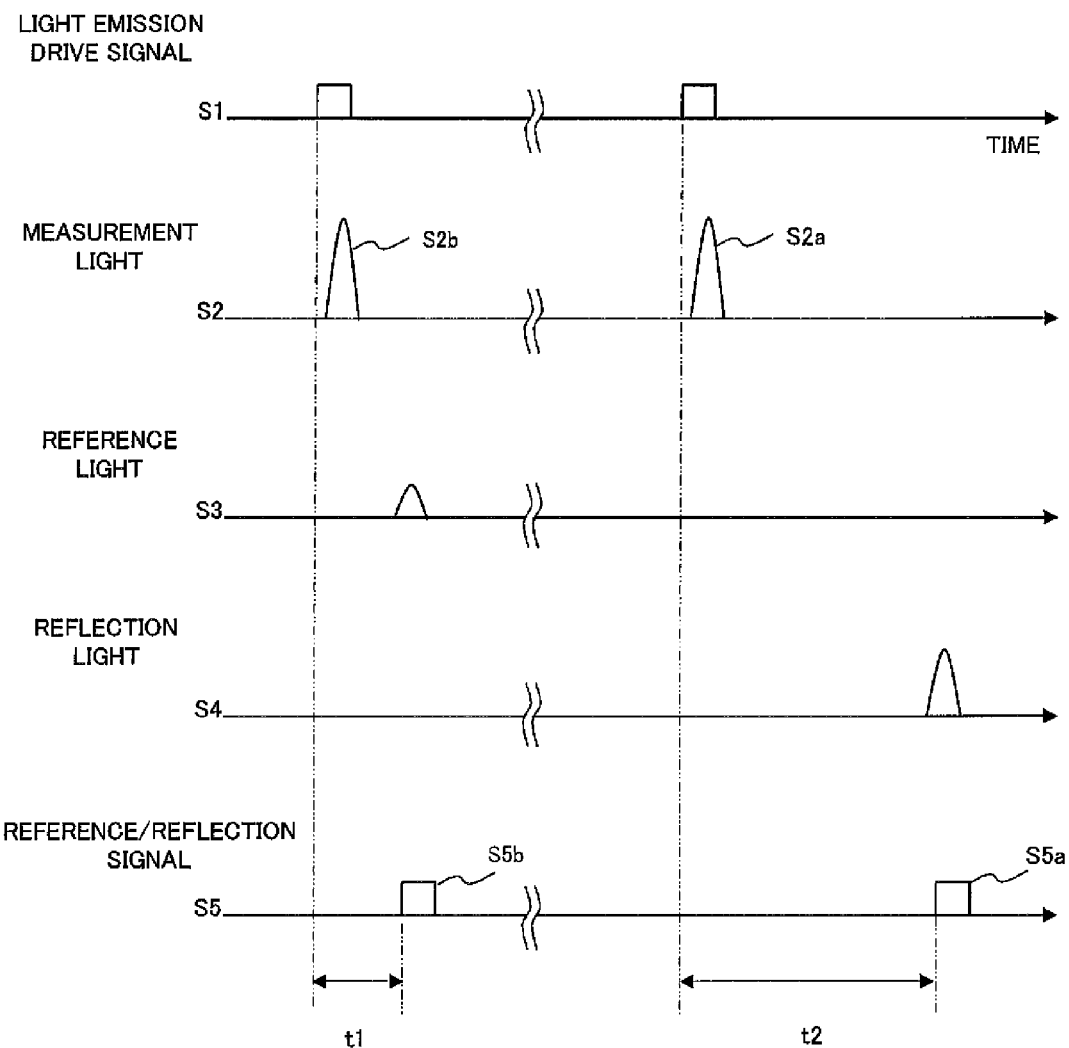
FIG. 10 is an explanatory diagram showing timings of light signal waveforms and electric signal waveforms of the scanning-type distance measuring apparatus.

As shown in FIG. 10, when a measurement timing signal is input to the light emission control unit 71 from the system control unit 76 which calculates the measurement timing on the basis of the pulse signal serving as an angle signal output from the scan angle detecting unit 15, a light emission drive signal S1 of a predetermined duty ratio is output to the light transmitting unit 3 from the light emission control unit 71 at a predetermined timing using the measurement timing signal as a reference.

In the light transmitting unit 3 which receives the light emission drive signal S1, the semiconductor laser 3a is driven by the drive circuit 3b, and measurement light in a pulse state is output.

When the scanning mechanism 4 is not located at the reference rotation position, reflection light S4 from the object to be measured in output measurement light S2 (S2a) is photoelectric-converted by the light receiving device 5a. The resultant electric signal is amplified by the amplification circuit 5b, and the amplified electric signal is output to the measurement light detecting unit 72.

The measurement light detecting unit 72 detects the electric signal as a reflection signal S5a and outputs it to the distance calculating unit 75. In a case where the scanning mechanism 4 is located at the reference rotation position, the measurement light detecting unit 72 does not detect a signal.

On the other hand, in a case where the scanning mechanism 4 is located at the reference rotation position, the output measurement light S2 (S2b) is not emitted to the outside the apparatus as reference light S3 but is detected by the light receiving unit 5 via the above-described light guiding member 17. An electric signal obtained by the photoelectric conversion in the light receiving unit 5 is amplified by the amplification circuit 5b to a predetermined level, and the amplified signal is output.

The reference light detecting unit 73 detects the electric signal as a reference signal S5b and outputs it to the correction value calculating unit 74. When the scanning mechanism 4 is not located at the reference rotation position, the reference light detecting unit 73 does not detect a signal.

The correction value calculating unit 74 calculates a time difference t1 between the light emission drive signal S1 corresponding to the measurement light S2b and the reference signal S5b, and calculates a correction value ΔL for the measurement distance between the scanning-type distance measuring apparatus and the object to be measured from the time difference t1 on the basis of the mathematical formula 2. The correction value ΔL is obtained as a distance L that is calculated by substituting the time difference t1 for T in the mathematical formula 2.

The distance calculating unit 75 calculates a time difference t2 between the light emission drive signal S1 corresponding to the measurement light S2a and the reflection signal S5a, and calculates the measurement distance L1 from the time difference t2 on the basis of the mathematical formula 2. The measurement distance L1 is obtained as a distance L that is calculated by substituting the time difference t2 for T in the mathematical formula 2.

The distance calculating unit 75 calculates the final measurement distance L2 by subtracting the correction value ΔL from the measurement distance L1 thus calculated.

The system control unit 76 outputs the direction and position of the object to be measured on the basis of the angle signal output from the scan angle detecting unit 15 and the final measurement distance L2. Specifically, the direction of the object to be measured with respect to the scanning-type distance measuring apparatus is calculated on the basis of the angle signal, and the distance L2 from the scanning-type distance measuring apparatus to the object to be measured is specified on the basis of the final measurement distance.

As described above, the light emitting device is intermittently driven synchronously with the measurement timing signal which is output in predetermined cycles, thereby obtaining the direction and distance of the object to be measured which is positioned in the space to be measured in the range of about 250 degrees around the rotation axis P as a center.

The measurement light detecting unit 72 or the reference light detecting unit 73 detects the time difference t1 or t2 between the light emission drive signal S1 and the reflection signal S5a or the reference signal S5b using the rising timing of each signal as a reference. The rising timing can be easily detected by providing a comparator for detecting a time point when each of the signals exceeds a predetermined threshold.

In the detection of the rising timing with use of the comparator, an error occurs due to the influence of small fluctuation in the rising of a signal according to intensity of reflection light. Consequently, to absorb such an error, the following method can be employed.

For example, the rising waveform of the reflection signal or reference signal is time-integrated, for example, until a peak value is indicated, and rising timing data corresponding to an integral value is derived from correction value map data of the rising timings corresponding to a plurality of integral values preliminarily stored in a memory. With such a configuration, the rising timing of the reflection signal or the reference signal can be accurately calculated. Used therein is the characteristic that the fluctuation in the rising time caused by the fluctuation in intensity of reflection light or reference light has a correlation with the integral value of the signal.

Another method may be employed in which, by calculating a peak value of the reflection signal or the reference signal and deriving the correction value corresponding to the peak value from the map data of the correction values corresponding to the plurality of peak values which are preliminarily stored in the memory, the rising timing of the reflection signal or the reference signal obtained by the comparator is corrected.

Used therein is the characteristic that the fluctuation in the rising time has a correlation with the peak value of the signal.

Further another method may be employed in which a differential signal is generated by performing temporal differentiation on the reflection signal or the reference signal, and the position of the center of gravity on the time axis in a positive range of the differential signal is obtained as the rising position of the reference signal or the reflection signal.

There may be employed a method of obtaining a rising timing by calculating the position of the center of gravity on the time axis of a rising part in the reflection signal or the reference signal, a method of straight-line approximating or polynomial approximating a rising part in the reflection signal or the reference signal and calculating the position of intersection between the approximation line and an offset level of an output signal as a rising timing, and the like.

Described in the embodiments is the case of employing, in the scanning-type distance measuring apparatus of the present invention, the TOF method of photoelectric-converting measurement light which is modulated in a pulse state and reflection light thereof and computing a distance from delay time between the signals. Alternatively, there may be employed the AM method of photoelectric-converting measurement light subjected to AM modulation with a sine wave and reflection light thereof, obtaining a phase difference between the signals, and computing a distance from the phase difference.

In this case, from the light transmitting unit 3 which receives the light emission drive signal from the light emission control unit 71, measurement light modulated with a sine wave is emitted from a semiconductor laser by the drive circuit 3b.

The correction value calculating unit 74 or the distance calculating unit 75 calculates the phase difference between the measurement light output from the light emitting device 3a and the measurement light signal or the reference light signal output from the amplification circuit 5b, and calculate the distance or the correction value by substituting the calculated phase difference for the mathematical formula 1.

The light emitting device used as the light source is not limited to the semiconductor laser but another light emitting device such as a light emitting diode can be used.

Any of the foregoing embodiments is an example of the present invention. Obviously, the concrete configurations of the parts such as the concrete shapes, configurations, materials used, and circuit configurations for signal process can be properly changed within the range of the effects of the present invention.

What is claimed is:

1. A scanning-type distance measuring apparatus for measuring a distance to an object to be measured based on measurement light and reflection light from the object to be measured, the apparatus comprising:
    an optical system including a first deflecting member that deflects the measurement light output from a light transmitting unit toward a space to be measured, a light receiving lens that condenses the reflection light from the object to be measured existing in the space to be measured, and a second deflecting member that deflects the reflection light passed through the light receiving lens toward a light receiving unit disposed to oppose the light transmitting unit, and an optical member that partly overlaps a light path to output the measurement light deflected by the first deflecting member with an incident light path for the reflected light to the second deflecting member; and
    a scanning mechanism that rotates the optical system about a predetermined axis.

2. The scanning-type distance measuring apparatus according to claim 1, wherein a region through which the measurement light passes in the light receiving lens is notched, and the measurement light is output from the notch.

3. The scanning-type distance measuring apparatus according to claim 1, wherein the optical member is configured by the first deflecting member and the second deflecting member where a deflecting face of the first deflecting member is extended to a part of a region along a scanning direction of the measurement light scanned by the scanning mechanism in a deflecting face of the second deflecting member.

4. The scanning-type distance measuring apparatus according to claim 3, wherein the first and second deflecting members are integrally formed.

5. The scanning-type distance measuring apparatus according to claim 3, wherein the optical member includes a cylindrical guide member that guides the measurement light deflected by the first deflecting member to the space to be measured.

6. The scanning-type distance measuring apparatus according to claim 1, wherein the optical member has two deflecting faces for making the measurement light deflected by the first deflecting member translate to be output from the incident light path of the reflection light to the second deflecting member.

7. The scanning-type distance measuring apparatus according to claim 6, wherein the optical member is disposed in a notch provided in the light receiving lens.

* * * * *